United States Patent
Yamada

(10) Patent No.: US 7,985,123 B2
(45) Date of Patent: Jul. 26, 2011

(54) ADHESIVE TAPE FOR FIXING LENS AND METHOD FOR PROCESSING LENS USING THE SAME

(75) Inventor: Fumikazu Yamada, Tokyo (JP)

(73) Assignee: Musashi Chemicals Industry Co., Ltd., Tokyo (JP)

( * ) Notice: Subject to any disclaimer, the term of this patent is extended or adjusted under 35 U.S.C. 154(b) by 929 days.

(21) Appl. No.: 11/576,762

(22) PCT Filed: Oct. 7, 2005

(86) PCT No.: PCT/JP2005/018616
§ 371 (c)(1),
(2), (4) Date: Oct. 30, 2007

(87) PCT Pub. No.: WO2006/041024
PCT Pub. Date: Apr. 20, 2006

(65) Prior Publication Data
US 2008/0166953 A1    Jul. 10, 2008

(30) Foreign Application Priority Data
Oct. 15, 2004    (JP) .................................. 2004-301446

(51) Int. Cl.
*B24B 1/00*    (2006.01)
(52) U.S. Cl. ........................... 451/42; 451/285; 451/460
(58) Field of Classification Search ................... 451/42, 451/285–290, 460
See application file for complete search history.

(56) References Cited

U.S. PATENT DOCUMENTS

| | | | |
|---|---|---|---|
| 4,221,083 A * | 9/1980 | Carroll | 451/42 |
| 5,520,568 A * | 5/1996 | Craighead et al. | 451/42 |
| 6,074,290 A * | 6/2000 | Ko et al. | 451/390 |
| 2002/0166625 A1* | 11/2002 | Ball et al. | 156/247 |
| 2004/0089515 A1* | 5/2004 | Yoo | 198/438 |
| 2005/0062301 A1* | 3/2005 | Yoo | 294/64.1 |
| 2005/0098887 A1* | 5/2005 | Ball et al. | 257/738 |
| 2005/0158968 A1* | 7/2005 | Nagai | 438/464 |
| 2006/0203222 A1* | 9/2006 | Ohmiya et al. | 355/72 |
| 2007/0045799 A1* | 3/2007 | Sekiya | 257/678 |

FOREIGN PATENT DOCUMENTS

| | | | |
|---|---|---|---|
| JP | 63-241086 | | 10/1988 |
| JP | 2002-355756 | | 12/2002 |
| JP | 2003-311595 | | 11/2003 |
| JP | 2004-122302 | | 4/2004 |
| JP | 2004-249454 | | 9/2004 |
| JP | 2005224888 A | * | 8/2005 |

* cited by examiner

*Primary Examiner* — Maurina Rachuba
(74) *Attorney, Agent, or Firm* — Rabin & Berdo, PC

(57) ABSTRACT

An adhesive tape, interposed between a lens to be processed and a holding jig when the lens is mounted in a lens processing machine, which has a plastic foam with holes opening in an adhering surface and an adhesive layer formed on the adhering surface of the plastic foam, and having a suction function for providing suction to the adhering surface together with elastic restoration after the plastic foam is deformed under compression. The adhesive tape of the present invention also exhibits sufficient shear adhesive strength in relation to a lens that has received surface processing and can realize precise lens processing.

10 Claims, 3 Drawing Sheets

ADHESIVE TAPE FOR FIXING LENS AND METHOD FOR PROCESSING LENS USING THE SAME

TECHNICAL FIELD

The present invention relates to an adhesive tape for fixing a lens used to protect a surface of the lens and to fix a holding jig during chamfering, grooving, or the like of the lens and further relates to a lens processing method using this tape.

BACKGROUND ART

For example, in the lens of glasses and the like, lens processing is necessary to adjust the shape of the lens to fit the shape of the frame, design of the frame, and the like, and therefore machining (known as edging) such as grooving or chamfering with a grindstone is executed. To execute the machining described above for the lens, a so-called lens-grinding machine is used and the shape of the lens can be altered to fit the shape of the frame of the glasses by mounting the lens supplied by the lens maker in the grinding machine and grinding the periphery with a grindstone.

The lens grinding machine, for example, is structured in a manner such that it contains a grinding chamber to process the lens, sandwiches the lens between a pair of clamp arms extending from drive units disposed on both sides of the grinding chamber, and grinds the periphery of the lens with the grindstone as the clamp arms rotate. A holding jig is attached to the tip of one of the clamp arms, the tip of the other clamp arm is equipped with an elastic material such as rubber and becomes the lens holder, and the lens to be processed is fixed by being sandwiched between these two clamp arms.

At this time, when the holding jig directly contacts the surface of the lens to be processed, since there are the worries that, for example, the surface of the lens to be processed will be scratched and that accurate processing cannot be performed because of possibilities such as the holding jig slipping and causing axial misalignment, adhesive tape is interposed between the holding jig and the lens to be processed when the lens to be processed is sandwiched by the holding jig.

In recent years, various surface coatings are administered to the lens used for glasses and the like, creating the problem that common adhesive tape cannot achieve sufficient adhesion. For example, in a lens with antifouling coating that makes dirt less likely to stick to the surface, the antifouling layer (water repellent coating) is formed by coating the surface of the lens with water repellent material such as a fluorine-containing silane compound. This water repellent coating does not only make dirt less likely to stick, but also has low hydrophilic properties in relation to the adhesive agent of the adhesive tape, and notably decreases the friction coefficient. Accordingly, with common adhesive tape, there is the problem that a large amount of holding power cannot be achieved and precise processing is impossible because of axial misalignment.

Considering the condition described above, various improvements have been attempted for the fixing of the lens with adhesive tape (see, e.g., Patent Document 1 (Japanese Patent Application Publication No. 2004-122302), Patent Document 2 (Japanese Patent Application Publication No. 2004-249454)). Specifically, in the invention described in Patent Document 1, a transparent adhesive sheet, that contains a surface having hydrophilic properties more favorable than the surface of the lens in relation to the adhesive agent and provided with an adhesive layer on the side of the lens, is affixed to the lens surface to attach the holding jig on the adhesive sheet via a double sided adhesive tape.

On the other hand, the invention described in patent document 2, for example, proposes a method for distinguishing adhesive tape having superior adhesive strength in relation to the antifouling layer formed mainly of a fluorine-containing silane compound, and adhesive strength in relation to the antifouling layer is assured to prevent axial misalignment by selecting the adhesive strength greater than or equal to a prescribed value in a case where a polyethylene terephthalate plate serving as a test plate that receives surface processing with a fluorinated silicone release agent I used.

However, as shown in the invention of Patent Document 1, in the method that simultaneously uses the adhesive sheet and the double sided adhesive tape, not only is the process of affixing the sheet and tape troublesome, but also there are unsatisfactory costs because an adhesive sheet with a large surface area is necessary. Furthermore, because of the water repellent coating, it is difficult to completely eliminate axial misalignment because sufficient holding power cannot be reliably achieved even with the large surface area of the adhesive sheet.

On the other hand, as shown in the invention of Patent Document 2, in a case where focus is placed on the adhesive strength of the adhesive tape, the use of the adhesive tape having high adhesive strength in relation to the antifouling layer leads to the prevention of axial misalignment, but where merely using the adhesive tape having high adhesive strength, the amount of strength required to peel off the adhesive tape is too great, creating the possibility that the antifouling layer or the like is also removed at a time when the adhesive tape is removed after processing. Therefore formation of a supplemental piece for protecting the surface coating becomes necessary, leading to a higher cost of the adhesive tape.

DISCLOSURE OF THE INVENTION

The present invention is proposed with consideration given to the conventional situation. That is, the present invention is intended to provide the adhesive tape for fixing a lens that can exhibit sufficient adhesive strength in relation to the lens that received surface processing and can fix the lens with sufficient strength without the use of an extra adhesive sheet or the like. Furthermore, the present invention is intended to provide the adhesive tape for fixing the lens that, while having sufficient adhesive strength in relation to the lens, has an appropriate level of strength when peeled off, and can achieve both a strong holding force and easy removal. Yet further, the present invention is intended to provide a lens processing method by which, through use of the aforementioned types of adhesive tape for fixing the lens, precise processing can be executed without axial misalignment or the like and the lens to be processed can be easily attached and removed with the use of the aforementioned types of adhesive tape for fixing the lens To achieve the aforementioned goals, according to this invention, an adhesive tape for fixing a lens, which is interposed between a lens to be processed and a holding jig in the case where the lens to be processed is mounted in a lens processing machine, has a plastic foam material containing openings in an adhering surface, and an adhesive layer formed on the adhering surface of the plastic foam material, the adhesive tape for fixing a lens having a suction function for providing suction to the adhering surface in accordance with elastic restoration after the plastic foam material is deformed under compression.

Furthermore, according to this invention, a lens processing method has the steps of interposing an adhesive tape for fixing a lens between a lens to be processed and a holding jig, and fixing the lens to be processed by the holding jig via the adhesive tape for fixing a lens. The interposing process and the fixing process are executed in machining process. The machining process uses the adhesive tape for fixing a lens including a plastic foam material containing openings in a surface to be adhered and an adhesive layer formed on the surface to be adhered of the plastic foam. The adhesive tape for fixing a lens has a suction function for providing suction to the surface to be adhered along with elastic restoration after the plastic foam material is deformed under compression.

During the lens processing, in a case where the lens to be processed is fixed by the holding jig and processed with the grindstone while the lens is being rotated, a large amount of shear force is added to the adhesive tape interposed between the lens to be processed and the holding jig. Accordingly, it is desirable that the adhesive tape have a high shear adhesive strength.

The adhesive tape contains the plastic foam material containing openings in a adhering surface, the adhesive layer formed on the adhering surface of the plastic foam material, and also has the suction function for providing suction to the adhering surface in accordance with elastic restoration after the plastic foam material is deformed under compression. The adhesive tape has significantly stronger adhesive strength in comparison to the conventional adhesive tape, and is formed such that the strongly adhesive structure is formed so the adhesive tape stably attaches to the lens surface through the suction function. Furthermore, the shear adhesive also has a sufficient effect on the lens surface that has been treated with water repellant coating or the like. Accordingly, this type of adhesive tape is optimal for fixing the lens to be processed that has received surface processing. Actually, where the adhesive tape having the suction function was used to fix the lens to be processed treated with the water repellant coating, it has been confirmed that a stable and fixed condition can be realized without axial misalignment or the like because of the high shear adhesive strength.

In addition, in a case of fixing the lens to be processed having a covering on the surface such as the water repellant coating, excessively high adhesive strength for removing the tape (peeling strength) can cause damage to the surface coating. The adhesive tape having the suction function used in the present invention has very high shear adhesive strength, but has a low adhesive strength for removing the tape, in other words, the adhesive tape of the present invention has a highly removable property. Accordingly, at the time of removal, the adhesive tape can quickly be removed from the surface of the lens after processing without damaging the surface coating. Furthermore, the supplemental piece for protecting the surface coating when the adhesive tape is removed is unnecessary.

The adhesive tape for fixing the lens of the present invention can exhibit sufficient shear adhesive strength in relation to the lens that received surface processing and can fix the lens to be processed with sufficient strength without the use of an extra adhesive sheet. Furthermore, despite having the high shear adhesive strength, the adhesive tape for fixing the lens of the present invention is easily removable after use without damaging the coating layer or the like on the surface of the lens because the adhesive tape has an appropriate adhesive strength for removal.

On the other hand, according to the present invention, the lens to be processed can easily be attached or removed and the machining process, such as chamfering or grooving by the grindstone, can be executed without causing axial misalignment.

BEST MODE FOR IMPLEMENTING THE INVENTION

Figure 1:
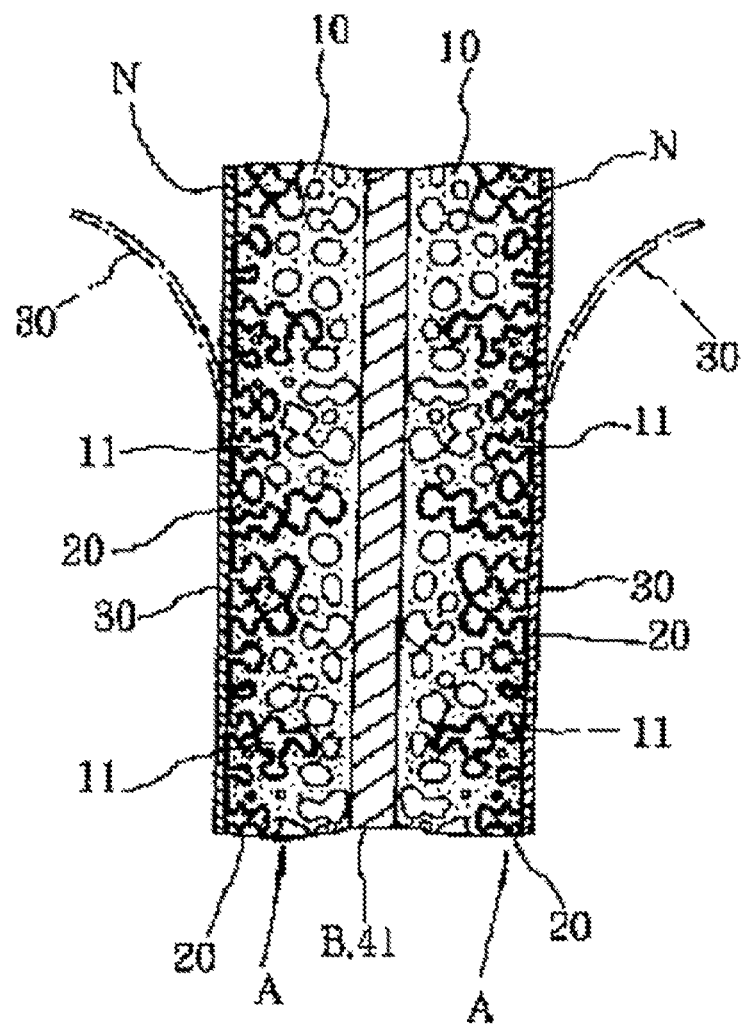
FIG. 1 is a cross sectional view of essential parts showing a structure of a adhesive tape for fixing a lens.

The following is a detailed description, given with diagrams, of an adhesive tape for fixing a lens and a lens processing method as applicable to the present invention.

First, the basic structure of the adhesive tape for fixing the lens of the present invention will be described. The adhesive tape for fixing the lens of the present invention is formed of a so-called strongly adhesive structure, in which a plastic foam material having an adhesive layer is equipped with porous openings on a surface (attachment surface) to be affixed to an adhesion target of the plastic foam material. Along with elastic restoration after the plastic foam material is deformed under compression, the plastic foam material has a suction function that responds with negative pressure to attach to the adhesion target surface.

In the strongly adhesive structure formed as described above, the adhesion function and the suction function act simultaneously on the attachment target surface and can reliably mutually fasten the attachment targets to each other. That is, in the aforementioned strongly adhesive structure, the adhering surface of the plastic foam material, especially the periphery of each of the pores, is adhered to the surface of the adhesion target by the adhesive agent, and can closely contact the target in an airtight manner with the pores of the suction surface providing suction to the plastic foam material.

In the strongly adhesive structure relating to the aforementioned construction, the adhesive layer may be formed in a manner to cover with the adhesive agent, for example, the surface including all or a portion of internal portions of the porous openings of the adhering surface, or the surface other than the internal portion of each porous opening in the adhering surface.

Especially in a case where the adhesive layer is formed by covering all of the internal portions of the porous openings of the adhesive surface, in the plastic foam material, the airtight property of the pores used for suction can be enhanced by the adhesive layer even where the adhesive layer is inside the pores. In a case where the adhesive layer is formed by covering the portion bordering the pores, when the plastic foam material facing the adhesion target surface is compressed, the border of the pores closely contacts the adhesion target surface, thereby functioning to enhance the suction of the pores. Further, in a case where the adhesive layer is formed by covering the surface except the internal portion of the pores, the plastic foam material is reliably adhered to the adhesion target surface by the adhesive layer and, along with being reliably attached to the adhesion target surface by the suction of the pores, the elastic deformation of the plastic foam material is not inhibited by the adhesive layer.

The pores having the vacuum-suction function, along with the adhesive layer, may be constructed independently in a manner such that the opening of each pore is empty while the remaining portion of the pores are filled with the adhesive agent. Alternatively, the pores and adhesive layer may be formed such that even though the pores opening in the adhering surface are linked, they do not continue or open in any surface other than the adhering surface, resulting in the structure of linked pores in an airtight condition. A further alternative is that the pores and adhesive layer may be formed such that each pore on an inner side of the plastic foam material is linked, without being linked to the adhesive layer on the outer surface of the plastic foam, resulting in the structure of the pore in an airtight condition.

The pores opening in the adhering surface from among the pores having the suction function, together with the adhesive layer of the plastic foam material, may be provided with a vacuum-suction function with respect to the adhesion target surface by making the surface other than the adhering surface have the airtight structure.

For the pores opening in the adhering surface, along with the adhesive layer of the plastic foam material, as a section providing suction according to the elastic restoration after compression, a synthetic resin may be applied to the surface other than the adhering surface of the plastic foam material, for example, to set the surface other than the attachment surface an airtight resin coating surface.

From such a point, by the various aspects described above, the plastic foam material used may be any kind of foam as long as it has a structure providing a vacuum-suction function at the time of elastic restoration after the deformation under compression of each of the pores opening in the adhering surface. For example, any arbitrary type of foam material can be used, such as a plastic foam material of an open cell type, a closed cell type, a mixed type of the open cell and the closed cell types, or the like. From these types of foam material, a vertically open cell type of plastic foam, for example, can be used as the typical plastic foam material. A plastic foam material may have a structure containing a base material such as a plastic sheet or a bonded material centrally disposed at an approximate center of the sheet of the plastic foam material in a thickness direction or one surface of the plastic foam material.

On the other hand, to form the adhesive layer of the adhering surface having the openings of the pores in the plastic foam material, a solvent type of urethane adhesive agent, a solvent type of acrylic adhesive agent, or an emulsion type of vinyl acetate adhesive agent can typically be used.

The adhesive layer can be formed by using a roller coating technique or the like to apply the adhesive agent having comparatively strong adhesive properties to the adhering surface of the plastic foam material. Alternatively, the adhesive layer can be formed by covering a portion or all of the internal portions of the pores formed in the adhering surface of the plastic foam material with a comparatively weaker adhesive agent using a doctor knife coating method or the like.

In the adhesive tape structured in the manner described above, the vacuum-suction function of the pores in accordance with the elastic restoration of the plastic foam material after compression and the adhesive function of the adhesive layer of the surface containing the pores can make a junction component (lens to be processed) be in a firmly held condition.

FIG. 1 shows an example of the cross sectional structure of the adhesive tape for fixing the lens to which the present invention is applied. The adhesive tape 1 for fixing the lens contains a plastic sheet 41 made from an acrylic resin, urethane resin, a foam of acrylic or urethane resin, and the like as a base material. The plastic foam materials 10 are equipped on both sides of the plastic sheet 41 in a united manner, respectively, the plastic sheet 41 serving as the base material. Each of the plastic foam materials 10 have multiple pores 11 opening in the adhering surface N and the adhesive layer 20 formed on each adhering surface N to construct the strongly adhesive construction A.

Each of the highly adhesive construction A equipped on the adhesive surfaces N of the plastic foam materials 10 is protected by a separation lining 30 and the adhesive target (lens to be processed) is held using the strongly adhesive construction A. When the adhesion target is held by the strongly adhesive construction A, the separation lining 30 that covers the surface of the adhesive layer 20 forming the strongly adhesive construction A is removed and the surface of the adhesive layer 20 of the plastic foam material 10 forming the strongly adhesive construction A is pressed once against the adhesion target surface. After this, the pressing is stopped and the plastic foam material 10 is held to the adhesion target surface by adhesion and suction. The opposite surface is the same.

Figure 2:
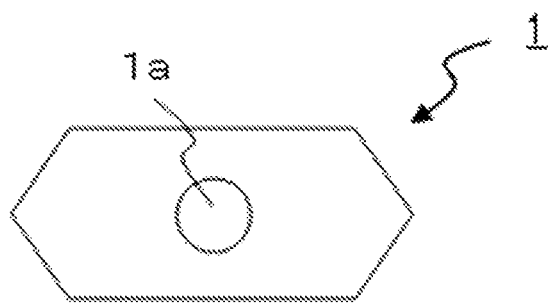
FIG. 2 is a planar view showing a planar state of the adhesive tape for fixing the lens.

The above is the structure of the adhesive tape for fixing the lens of the present invention, but the adhesive tape 1 for fixing the lens having the aforementioned structure, as shown in FIG. 2, can be but to use by being punched out into the shape corresponding to the shape of the lens for glasses. In the present embodiment, the adhesive tape 1 for fixing the lens is punched out into a hexagonal shape in a manner to make the length measurement L and the width measurement W to have proportions almost identical to those of the lens for glasses. A central hole 1a, for example, is a hole for confirming a marker in the lens to be processed.

The aforementioned adhesive tape for fixing the lens, when used to fix the lens to be processed, exhibits superior shear adhesive strength and can firmly fix the lens without causing axial misalignment or the like. Chart 1 shows a comparison of the shear adhesive strength of between common adhesive tapes and the adhesive tape for fixing the lens of the present invention. The shear adhesive strength was measured in compliance with Japanese industrial specification JIS Z 0237. The dimensions of an adhesion area of the adhesive tape were 25 mm by 25 mm, the pulling speed was 300 mm/min, the pressure bonding condition was that of a roller of 10 kg reciprocated twice, and the treatment time was 72 hours (at room temperature). Further, three kinds of sheets, i.e., stainless steel (SUS 304), an acrylic resin sheet, and an ultrahigh molecular weight polyethylene sheet, were used as adhesion target test pieces.

CHART 1

| | Shear adhesive strength (N/cm$^2$) | | |
|---|---|---|---|
| | SUS 304 | ACRYLIC | ULTRAHIGH MOLECULAR WEIGHT PE |
| ADHESIVE TAPE OF THE PRESENT INVENTION | 131.32 | 127.21 | 91.57 |
| COMMERCIAL PRODUCT A | 118.7 | 84.51 | 51.28 |
| COMMERCIAL PRODUCT B | 133.32 | 83.5 | 44.13 |
| COMMERCIAL PRODUCT C | 97.49 | 72.12 | 42.83 |
| COMMERCIAL PRODUCT D | 115.99 | 104.38 | 34.55 |

It is clear from Chart 1 that the adhesive tape for fixing the lens of the present invention exhibits superior shear adhesive strength, even for the ultrahigh molecular weight polyethylene, which is difficult for the common adhesive tape to adhere to. The common commercial products show favorable shear adhesive strength for the stainless steel or the like, but the shear adhesive strength for the ultrahigh molecular weight polyethylene is significantly inferior compared to that of the adhesive tape of the present invention. Further, it was understood that a removal adhesive strength at 90 degrees of the adhesive tape for fixing the lens of the present invention is as low as 4.2 N/cm$^2$, making the adhesive tape easily removable from the lens to be processed.

It is desirable that the adhesive tape for fixing the lens having the aforementioned structure has a total thickness of 5 mm or less because it exhibits the better shear adhesive strength in a case where the adhesive tape is thinner. Specifically, the thickness of the plastic sheet 41 should be 0.1 mm and the thickness of each of the plastic foam materials 10 should be 0.05 mm, for example.

Because the adhesive tape for fixing the lens having the aforementioned structure exhibits the superior shear adhesive strength even for the lens that receives chamfering with water repellent coating or the like, for example, precise processing can be executed by using the adhesive tape to firmly fix the lens to be processed in the lens processing machine. The following is a description of a lens processing method using the adhesive tape for fixing the lens of the present invention.

The lens processing machine is equipped with the grinding chamber for executing a mechanical grinding process, such as chamfering or grooving, for the lens to be processed. The lens to be processed is mounted in the grinding chamber to execute the grinding process. Drive sections are disposed on both sides inside the grinding chamber. The lens to be processed is sandwiched between clamp arms extending from the drive sections and these clamp arms are rotated to execute grinding for the periphery of the lens to be processed.

Figure 3:
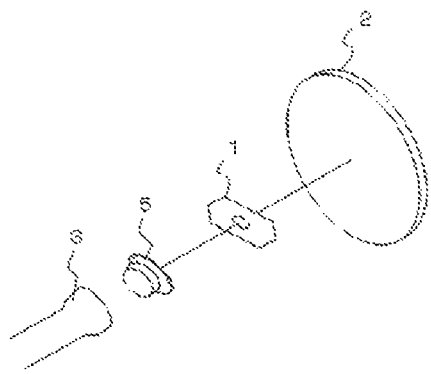
FIG. 3 is an exploded perspective view showing a structure of a fixed lens to be processed.
Figure 4:
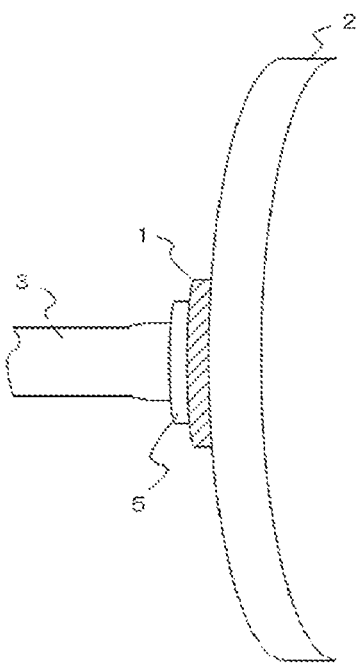
FIG. 4 is a cross sectional view showing a state of the fixed lens to be processed.

FIG. 3 is a diagram showing the condition where the clamp arm 3 is attached to the lens 2 to be processed. In a case where the lens 2 to be processed is fixed by each clamp arm 3, holding jigs 5 are mounted on the tips of the clamp arms 3 so that the lens 2 to be processed is fixed by being stuck between the holding jigs 5. It should be noted that there is the fear that the surface of the lens 2 to be processed would be scratched where the holding jig 5 directly contacts the surface of the lens 2 to be processed, so that the lens is mounted on the holding jig 5 via the adhesive tape 1 for fixing the lens. Therefore, because of the shear adhesive strength of the adhesive tape 1 for fixing the lens to be processed 2, the lens 2 to be processed is reliably fixed in association with the rotation of the clamp arm 3 while at the same time protecting the surface of the lens 2 to be processed from being scratched. FIG. 4 is a diagram showing the condition where the adhesive tape 1 for fixing the lens is fixed in use.

During the processing of the lens 2 to be processed, a water supply nozzle supplies water to the portion to be processed to simultaneously wash away powder resulting from the grinding and cool the portion to be processed in the grinding process. The grinding process is executed using a grinding stone and the type of grinding stone is chosen according to the type of grinding process, such as chamfering or grooving, and the material of the grinding target, which is the lens 2 to be processed.

The grinding of the lens 2 to be processed is executed based on lens shape data and the like previously stored in the device, or by tracing the shape of a dummy lens, for example tracing the shape of a glasses frame. Since the lens 2 to be processed is firmly fixed by the shear adhesive strength of the adhesive tape 1 for fixing the lens during the grinding process, precise processing can be executed without axial misalignment or the like.

Figure 5:
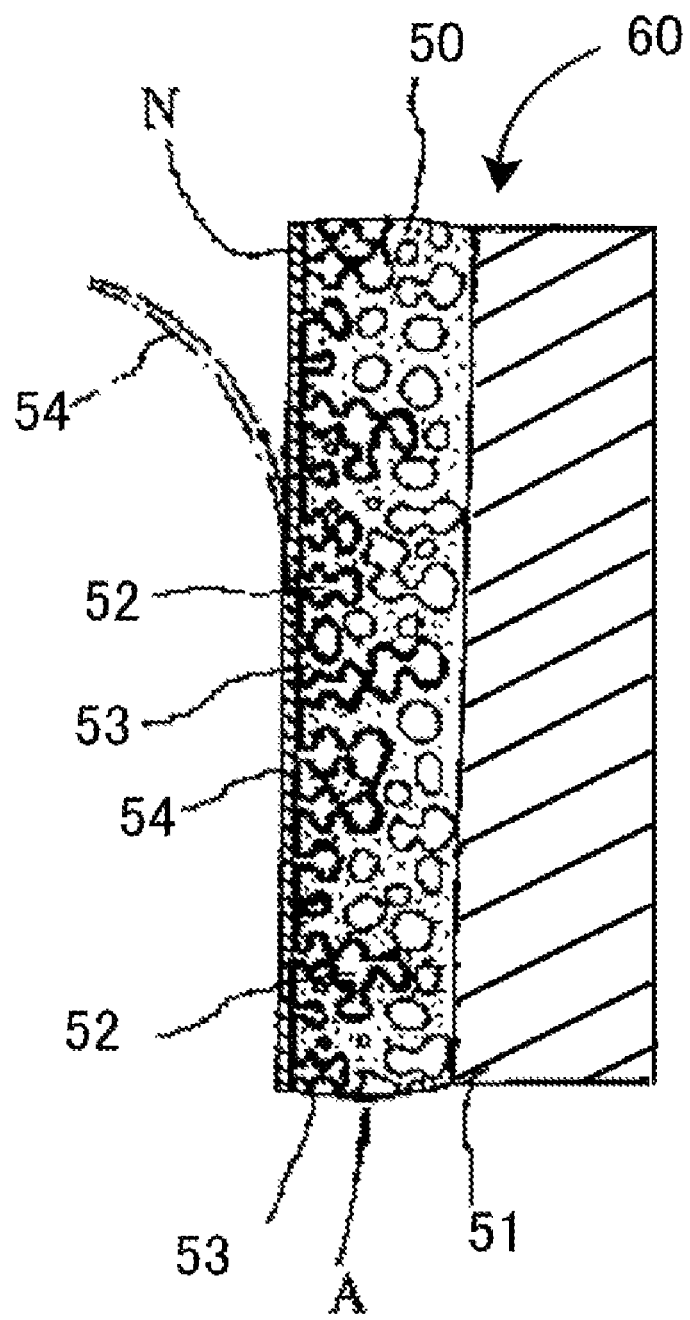
FIG. 5 is a cross sectional view of essential parts showing another structure of the adhesive tape for fixing the lens.

FIG. 5 is a diagram showing another example of the cross-sectional structure of the adhesive tape for fixing the lens as applied to the present invention. An adhesive tape 60 for fixing a lens contains a plastic sheet 51 made from an acrylic resin, urethane resin, a foam of acrylic or urethane resin, and the like as a base material. A plastic foam material 50 is equipped on one side of the plastic sheet 51 in a united manner, the plastic sheet 51 serving as the base material. The plastic foam material 50 has multiple pores 52 opening in the adhering surface N and the adhesive layer 53 formed on the adhering surface N to construct the strongly adhesive construction A.

The highly adhesive construction A equipped on the adhering surface N of the plastic foam material 50 is protected by a separation lining 54 and the adhesion target (lens to be processed) is held using the strongly adhesive construction A. When the adhesion target is held by the strongly adhesive construction A, the separation lining 54 that covers a surface of a adhesive layer 53 forming the strongly adhesive construction A is removed, the surface of the adhesive layer 53 of the plastic foam material 50 forming the strongly adhesive construction A is pressed once against the adhesion target surface. After this, the pressing is stopped and the plastic foam material 50 is held to the adhesive target surface by adhesion and suction. This one sided construction exhibits the same adhesive properties as the adhesive tape for fixing the lens having the double sided construction of FIG. 1.

What is claimed is:

1. A lens processing method using adhesive tape comprising:
    a plastic foam material including an adhering surface, and pores having openings formed at the adhering surface; and
    an adhesive layer formed on the adhering surface of the plastic foam material so as not to close the openings, and being further formed on at least a part of internal surfaces of the pores,
    wherein the adhesive tape for fixing a lens has a suction function for providing suction at the adhering surface along with elastic restoration after the plastic foam material is deformed under compression, at a time when the lens to be processed is fixed to a holding jig via the adhesive tape for fixing the lens at a time when a machining process is executed.

2. The lens processing method according to claim 1, wherein the machining process is a grooving or chamfering process by a grindstone.

3. An adhesive tape for fixing a lens, and being interposed between the lens to be processed and a holding jig at a time when the lens to be processed is mounted in a lens processing machine, the adhesive tape comprising:
    a plastic foam material including an adhering surface, and pores having openings formed in the adhering surface; and
    an adhesive layer formed on the adhering surface of the plastic foam material so as not to close the openings, and being further formed on at least a part of internal surfaces of the pores,
    wherein the plastic foam material has a suction function for providing suction at the adhering surface along with elastic restoration after the plastic foam material is deformed under compression.

4. The adhesive tape for fixing the lens according to claim 3, wherein the adhesive layer comprises a first adhesive layer formed on a first side of the plastic foam material;
   further comprising a second adhesive layer, formed on another side of the plastic foam material.

5. The adhesive tape for fixing the lens according to claim 3, wherein the adhesive layer is formed on one side of the plastic foam material.

6. The adhesive tape for fixing the lens according to claim 3, wherein a combined thickness of the plastic foam and the adhesive layer is less than or equal to 5 mm.

7. The adhesive tape for fixing the lens according to claim 3, further comprising a peeling sheet formed in a separable manner so that the peeling sheet contacts the adhesive layer, and sheet is removed from the adhesive layer at a time of use.

8. The adhesive tape for fixing the lens according to claim 3, wherein the adhesive tape has a shape corresponding to an external shape of the lens to be processed.

9. The adhesive tape for fixing the lens according to claim 3, further comprising a base material on which the plastic foam material is formed.

10. An adhesive tape for fixing a lens to be processed and being interposed between the lens and a holding jig at a time when the lens is mounted in a lens processing machine, the adhesive tape comprising:

a first plastic foam material, having a first adhering surface and pores having openings formed in the first adhering surface;

a second plastic foam material having a second adhering surface and pores having openings formed in the second adhering surface;

a base material between the first and second plastic foam materials;

a first adhesive layer, formed on the first adhering surface of the first plastic foam material so as not to close the openings in the first adhering surface; and a second adhesive layer formed on the second adhering surface of the second plastic foam material so as not to close the openings in the second adhering surface;

wherein each plastic foam material has a suction function for providing suction at each adhering surface along with elastic restoration after the plastic foam material is deformed under compression; and wherein at least one of the adhesive layers is further formed on at least a part of internal surfaces of the pores.

\* \* \* \* \*